United States Patent [19]

Schittek et al.

[11] 4,339,075

[45] Jul. 13, 1982

[54] BIMETALLIC-CONTROLLED STEAM TRAP

[75] Inventors: Friedrich Schittek, Stuhr; Volkmar Jahn, Bremen, both of Fed. Rep. of Germany

[73] Assignees: Gustav F. Gerdts KG; Gestra-Ksb Vertriebsgesellschaft mbH & Co. Kommanditgesellschaft, both of Bremen, Fed. Rep. of Germany

[21] Appl. No.: 225,829

[22] Filed: Jan. 16, 1981

[30] Foreign Application Priority Data

Jan. 23, 1980 [DE] Fed. Rep. of Germany ....... 3002294

[51] Int. Cl.$^3$ .............................................. F16T 1/08
[52] U.S. Cl. .................... 236/59; 236/48 R; 236/93 R
[58] Field of Search ............ 236/48 R, 93 R, 59, 236/101 C, 101 E; 251/75

[56] References Cited

U.S. PATENT DOCUMENTS

| 1,321,395 | 11/1919 | Rustige et al. | 236/48 R |
| 1,993,814 | 3/1935 | Vaughn | 236/48 R |
| 2,102,656 | 12/1937 | Vaughn | 236/48 R X |
| 3,036,592 | 5/1962 | Lips | 251/75 X |
| 4,165,762 | 8/1979 | Acar | 251/75 X |

FOREIGN PATENT DOCUMENTS 1294126  4/1969  Fed. Rep. of Germany ........ 236/59

Primary Examiner—William E. Tapolcai, Jr.
Attorney, Agent, or Firm—Allison C. Collard; Thomas M. Galgano

[57] ABSTRACT

A steam trap has a control member which includes a bimetallic element at the prepressure side and a locking element, which is biased by the prepressure in an opening direction relative to a valve seat provided for the locking element. The bimetallic element is supported at one end on an abutment and it actuates the locking element with its other end. At least one snap spring which is supported on the abutment is effective on the control member in the direction of the locking element stroke axis, and it has a spring constant which is numerically larger than the spring constant of the bimetallic element.

3 Claims, 3 Drawing Figures

BIMETALLIC-CONTROLLED STEAM TRAP

The invention relates to a steam trap. More particularly, it relates to a steam trap of the type having a control member which includes a bimetallic element at the prepressure side and a locking element which is biased by the prepressure in the opening direction, wherein the bimetallic element is supported at one end on an abutment and actuates the locking element with its other end and a valve seat for the locking element.

In such steam traps, an intermittent operation is desirable, i.e., a sudden wide opening and a sudden closing. For this purpose, when large quantities of throughflow occurs, it is known to provide a large pressure admittance face on the downstream end of the locking element, whereby the discharging condensate exerts an additional opening force on this admittance face, thus increasing the opening force for the locking element, and effecting a further or wider opening. However, this additional opening force is only generated after a certain opening stroke of the locking element when condensate is already flowing. When only small amounts of condensate are present and the locking element opens only insignificantly, a balanced condition is obtained between the locking forces of the bimetallic element and the opening forces on the locking element defined by the pressure. The locking element therefore remains in a throttle position which is disadvantageous with respect to the flow wear and impurity deposits and it does not snap into the wide open position.

It is therefore an object of the subject invention to provide a steam trap of the aforementioned type, whereby the locking element snaps from a locked or closed position into a wide open position even when only insignificant amounts of condensate are present, and which again snaps into a complete closed position after the condensate is discharged.

This object of the invention is obtained by the provision of at least one snap spring supported on an abutment which is effective on the control member in the direction of the locking element stroke axis, the spring constant of which is numerically larger than the spring constant of the bimetallic element.

As is very well known, a snap spring has the characteristic that it executes a sudden stroke below or above the limit value of the load force. When the bimetallic element in the steam trap cools to the desired opening temperature, the effective locking or closing force of the bimetallic element is lowered accordingly and falls below the limit force of the snap. Therefore, the wire snap spring snaps while simultaneously compressing the bimetallic element in the opening direction.

Due to the different spring constants, the stroke dependent force change is larger on the spring snap than on the bimetallic element and the locking element accordingly snaps immediately from the closing position into a wide open position and later, after discharging the condensate, into a complete locking position.

Preferably, the snap spring comprises at least one monostable snap spring which is effective on the control member in the opening direction of the locking element. This affords the possibility of providing a positive connection in only one stroke direction between the snap spring and the locking element. Thereby, if so desired, the maximum stroke of the locking element may be larger than that of the snap spring during a particularly high cold condensate throughflow capacity, for example. Furthermore, the monostable snap spring does not exert any locking force on the locking element in contrast to a bistable snap spring, so that with a cold pressureless steam trap, the locking element automatically assumes its open position.

Most advantageously, the snap spring is disposed between the valve seat and the bimetallic element, and a stationary abutment is provided for the snap spring, as well as for the bimetallic element. It is also preferable that the locking element be provided with a cam abutment disposed between the valve seat and the snap spring for engagement with the latter.

Most desirably, a plurality of snap springs are provided superimposed in the same direction. The spring constant of the total plurality of snap spring is larger than the spring constant of the bimetallic element. This affords a particularly large snap stroke by providing a plurality of thin snap springs instead of one thick snap spring.

Other objects and features of the present invention will become apparent from the following detailed description when taken in connection with the accompanying drawing which discloses one embodiment of the invention. It is to be understood that the drawing is designed for the purpose of illustration only and is not intended as a definition of the invention.

In the drawing, wherein similar reference characters denote similar elements throughout the several views.

Figure 1:
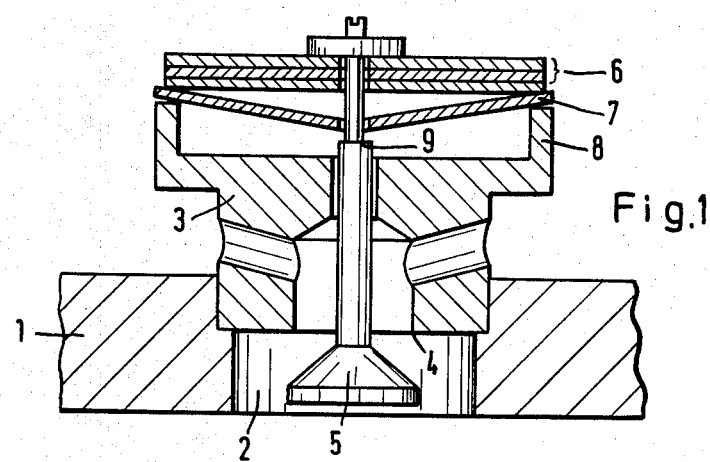
FIG. 1 is a fragmentarily-illustrated sectional view, in part elevation, of a steam trap embodying the present invention, in a wide open position.

Referring now in detail to the drawing, in a steam trap housing (not shown), a separating wall 1 is provided between the high or prepressure side and the low pressure side. Wall 1 has a bore 2 in which is mounted a valve seat element 3 having an associated valve seat 4. Furthermore, a control element is provided comprising a locking element 5 which cooperates with valve seat 4 and which is loaded biased by the prepressure in an opening direction, relative to valve seat 4. The control element also includes a bimetallic element 6 which actuates locking element 5 and is disposed on the prepressure side. Bimetallic element 6 is composed of a plurality of oppositely arched (when heated), superimposed bimetallic disks.

A monostable plate-like or disk-shaped snap spring or snap spring 7 is provided between bimetallic element 6 and valve seat 4, the spring constant of which is numerically larger than that of bimetallic element 6. A snap spring has the specific characteristic that a reduction of the spring force occurs at least along a portion of the spring stroke with one stroke movement in the direction of the spring load. Moreover, the direction of the effective spring force remains the same over the total spring stroke when the spring is monostable. For example, no reversal of force occurs, such as a change from a pushing force into a pulling force. Snap spring 7 comes into engagement on valve seat element 3 by means of an annular-like rigid abutment 8. Abutment 8 serves also as a stationary abutment for bimetallic element 6. Finally, locking element 5 is provided with a cam abutment 9 provided on its shaft at a position disposed between wire snap 7 and valve seat 4.

The disks of bimetallic element 6 are not arched when the steam trap is cold and the snap spring 7 is in its stable end position in a convex arch with respect to valve seat 4. Thereby, locking element 5 assumes its fully opened position (FIG. 1), so that large quantities of cold condensate may be discharged.

During heating, a constant arching of the disks of bimetallic element 6 occurs. Thereby, locking element 5 is lifted and at the same time snap spring 7 is tensioned by cam abutment 9. The spring force at first continuously increases in the locking element opening direction until reaching the desired locking temperature, for example, almost saturated steam, at which time the spring stroke reaches the declining stage of the spring characteristics, whereby the opening force reduces with increasing compression of the snap spring 7.

Figure 2:
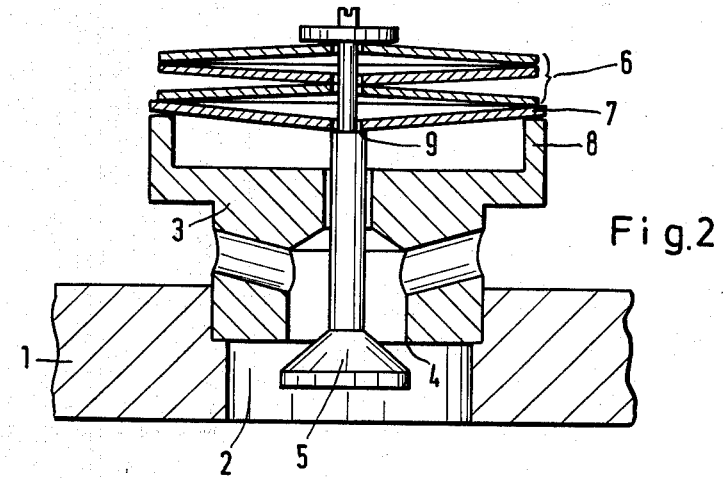
FIG. 2 is a sectional view comparable to that of FIG. 1, but showing the steam trap in a transition state while still in a wide open position.
Figure 3:
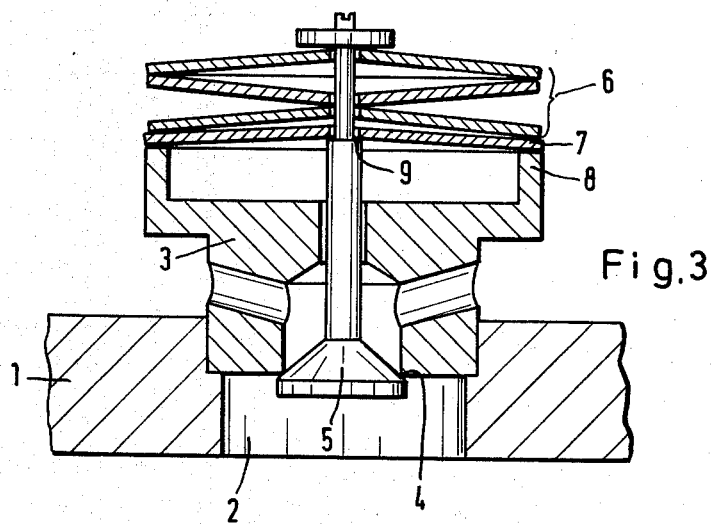
FIG. 3 is a sectional view comparable to that of FIGS. 1 and 2, but showing the steam trap in a closed position.

Since the force change per stroke unit is larger in snap spring 7 than in bimetallic element 6, locking element 5 snaps from its wide open position (FIG. 2) immediately into the locking or closing position (FIG. 3).

When the temperature drops in the steam trap, the locking force of bimetallic element 6 also drops. Finally, the opening forces of the prepressure and snap spring 7 prevail. Since, according to the spring constants, the stroke dependent force increase is larger in snap spring 7 than in bimetallic element 6, locking element 5 snaps into a wide open position (FIG. 2) under the compression of bimetallic element 6. Only then is a balance between the effective opening and locking forces obtained.

The snaping open into a wide open position and also the closing movement occurs independently of the quantity of the condensate to be discharged. Therefore, undesired throttle positions are always avoided.

A particularly large snap stroke may be achieved with a relatively small spring diameter by superimposing a plurality of thin snap springs in the same direction, instead of a thick one. There is also the possibility to provide the locking element with a large admittance face on the downstream side thereof for extremely large throughflow capacities, so that a further opening stroke is obtained in addition to the wide open position.

Thus, while only one embodiment of the present has been shown and described, it will be obvious that many changes and modifications may be made thereunto, without departing from the spirit and scope of the invention.

What is claimed is:

1. In a steam trap of the type having a valve seat, a fixed abutment, a control member including a bimetallic element disposed on the prepressure side of said valve seat and a stroke-movable locking element which cooperates with the valve seat and is biased in an opening direction with respect to the valve seat by the prepressure, wherein said bimetallic element has one side disposed for cooperative engagement with said locking element so as to urge the same in a closing direction with respect to the valve seat and an opposite side by which it is supported, and at least one spring supported on said fixed abutment and disposed for cooperative engagement with said control member which executes a stroke movement in the direction of the stroke axis of said locking element, the improvement comprising:

said bimetallic element being supported on its other side on a fixed abutment and said spring being a monostable snap spring which acts on said control member in the opening direction of said locking element, said snap spring having a spring constant which is numerically larger than the spring constant of said bimetallic element.

2. The steam trap according to claim 1, wherein said snap spring is disposed between said valve seat and said bimetallic element, and wherein said fixed abutment for said snap spring and said fixed abutment for said bimetallic element are the same element.

3. The steam trap according to claim 1, wherein a cam abutment is provided on said locking element, which cam abutment is disposed between said valve seat and said snap spring for engagement with said snap spring.

* * * * *